United States Patent
Su et al.

(10) Patent No.: US 8,139,032 B2
(45) Date of Patent: Mar. 20, 2012

(54) POWER-SAVING COMPUTER MOUSE

(76) Inventors: Kuo-Hsin Su, Hsintien (TW); I-Te Chang, Taipei (TW)

( * ) Notice: Subject to any disclaimer, the term of this patent is extended or adjusted under 35 U.S.C. 154(b) by 635 days.

(21) Appl. No.: 12/318,077

(22) Filed: Dec. 22, 2008

(65) Prior Publication Data

US 2010/0156790 A1    Jun. 24, 2010

(51) Int. Cl.
  *G06F 3/033*    (2006.01)
  *G09G 5/08*    (2006.01)
(52) U.S. Cl. ........................................ 345/163; 345/156
(58) Field of Classification Search .......... 345/156–169, 345/173, 179
See application file for complete search history.

(56) References Cited

U.S. PATENT DOCUMENTS

| | | | |
|---|---|---|---|
| 7,486,386 B1 * | 2/2009 | Holcombe et al. | 356/4.01 |
| 2005/0114714 A1 * | 5/2005 | Albulet | 713/300 |
| 2005/0146499 A1 * | 7/2005 | Casebolt et al. | 345/157 |
| 2005/0168438 A1 * | 8/2005 | Casebolt et al. | 345/156 |
| 2005/0200603 A1 * | 9/2005 | Casebolt et al. | 345/157 |
| 2005/0240785 A1 * | 10/2005 | Casebolt et al. | 713/300 |
| 2008/0084385 A1 * | 4/2008 | Ranta et al. | 345/157 |

* cited by examiner

*Primary Examiner* — Ricardo L Osorio
(74) *Attorney, Agent, or Firm* — Rosenberg, Klein & Lee

(57) ABSTRACT

A power-saving computer mouse having installed therein a switching transistor and a proximity sensor switch formed of a capacitive proximity sensor and a charge induction plate for controlling said switching transistor to switch on the power supply circuit when the user holds the computer mouse with a hand, or to switch off the power supply circuit when the user moves the hand away from the computer mouse.

4 Claims, 6 Drawing Sheets

POWER-SAVING COMPUTER MOUSE

BACKGROUND OF THE INVENTION

1. Field of the Invention

The present invention relates to computer mice and more particularly, to a power-saving computer mouse.

2. Description of the Related Art

Conventional computer mice include wired type computer mice and wireless type computer mice. FIGS. 9 and 10 show a conventional wireless computer mouse 2, which comprises a microprocessor 21, a wireless transmitter 211, a button and roller/optical signal receiving and processing unit 212, a transmitting antenna 213, and a battery 23 that provides the necessary working voltage. To extend the service life of the battery 23, a power switch 22 is provided for enabling the user to switch off the battery 23 when the wireless computer mouse 2 is not used. The time in which the user operates the wireless computer mouse 2 is about 10~20% of the time in which the computer is in operation. However, when the power switch 22 is switched on, the wireless computer mouse 2 keeps consuming the power of the battery 23. FIG. 11 illustrates the power consumption status of the wireless computer mouse 2. Further, according to the control circuit of a conventional wired computer mouse, as shown in FIG. 12, when the USB cable 214 of the wired computer mouse is connected to a notebook computer, the button and roller/optical signal receiving and processing unit 212 starts consuming the battery power of the notebook computer. The power consumption status of this wired computer mouse is illustrated in FIG. 13.

SUMMARY OF THE INVENTION

The present invention has been accomplished under the circumstances in view. According to the present invention, a power-saving computer mouse has installed therein a switching transistor and a proximity sensor switch. The proximity sensor switch comprises a charge induction plate and a capacitive proximity sensor. When a user uses the power-saving computer mouse, an electric charge is induced in the charge induction plate upon approaching of the user's hand, and the capacitive proximity sensor outputs a high potential when sensed a change of electric charge in the charge induction plate, thereby switching on the power circuit of the power-saving computer mouse. Therefore, the power-saving computer mouse achieves a green environment protection-oriented battery power saving effect.

Further, the invention uses a proximity sensor switch to control on/off of the power circuit, lowering the failure rate. Because the invention eliminates the use of an on/off switch to control on/off of the power circuit, the cost of the computer mouse can be relatively reduced and, the outer appearance of the computer mouse is kept intact.

DETAILED DESCRIPTION OF THE PREFERRED EMBODIMENT

Figure 1:
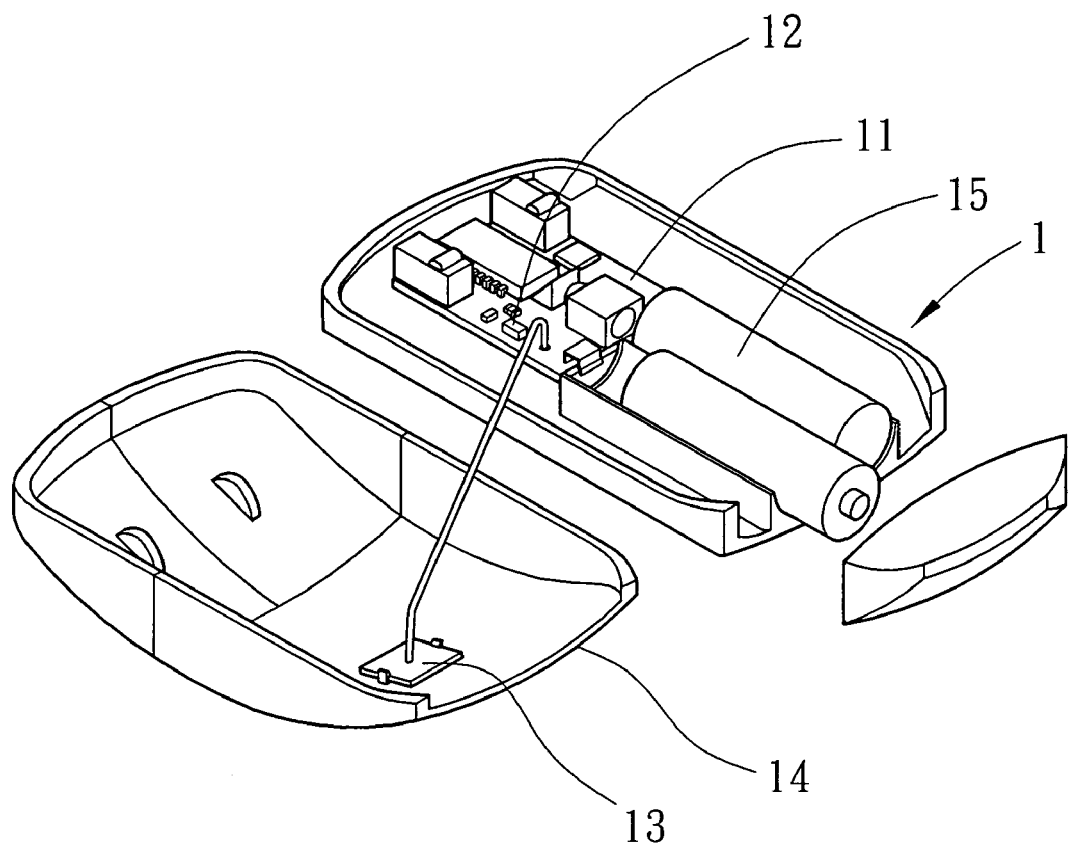
FIG. 1 is an exploded view of a wireless power-saving computer mouse in accordance with the present invention.
Figure 2:
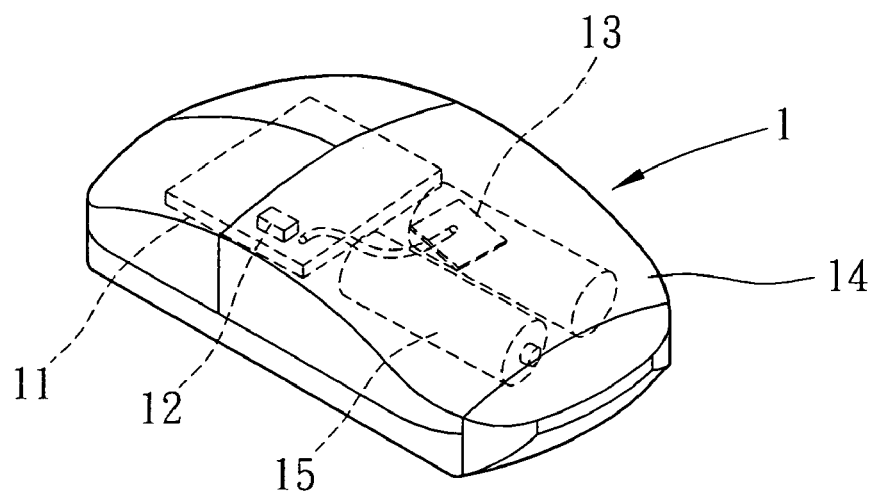
FIG. 2 is a perspective view of the wireless power-saving computer mouse in accordance with the present invention.
Figure 3:
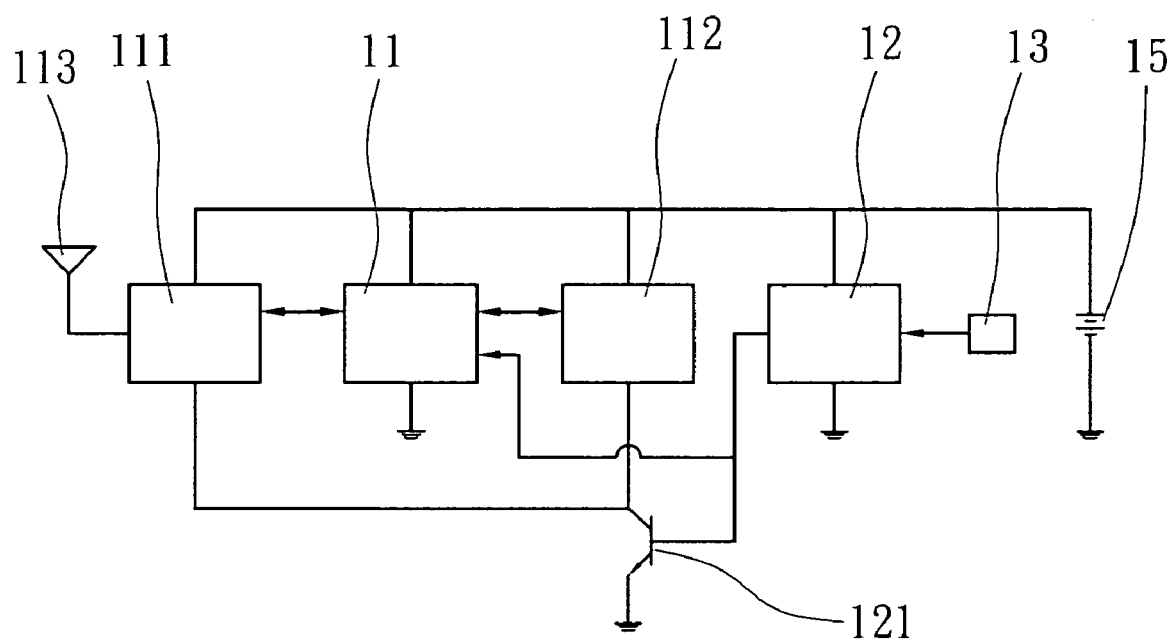
FIG. 3 is a circuit block diagram of the control circuit of the wireless power-saving computer mouse in accordance with the present invention.
Figure 4:
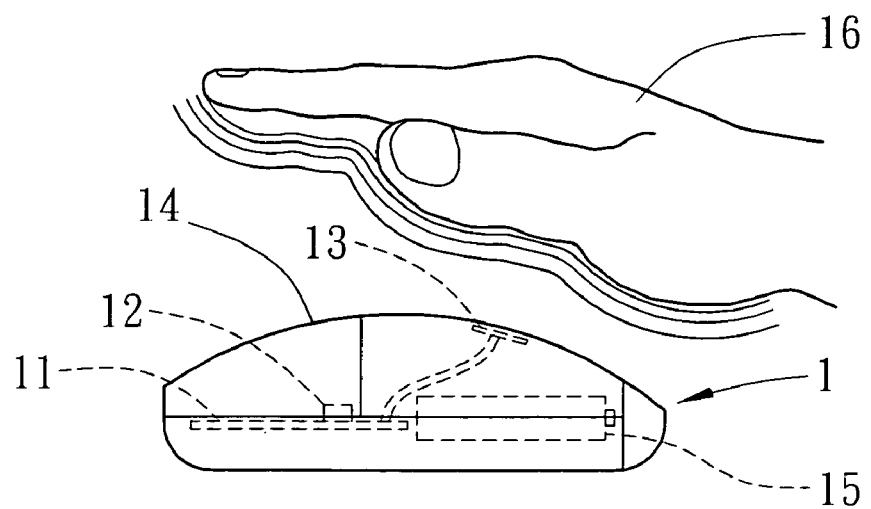
FIG. 4 is a schematic drawing of the present invention, showing a user's hand left from the housing of the wireless power-saving computer mouse.
Figure 5:
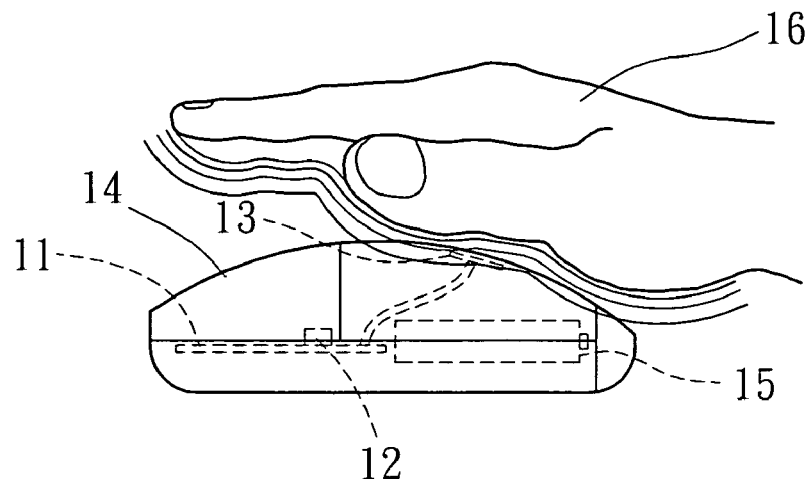
FIG. 5 is a schematic drawing of the present invention, showing a user's hand kept in proximity to the housing of the wireless power-saving computer mouse.
Figure 6:
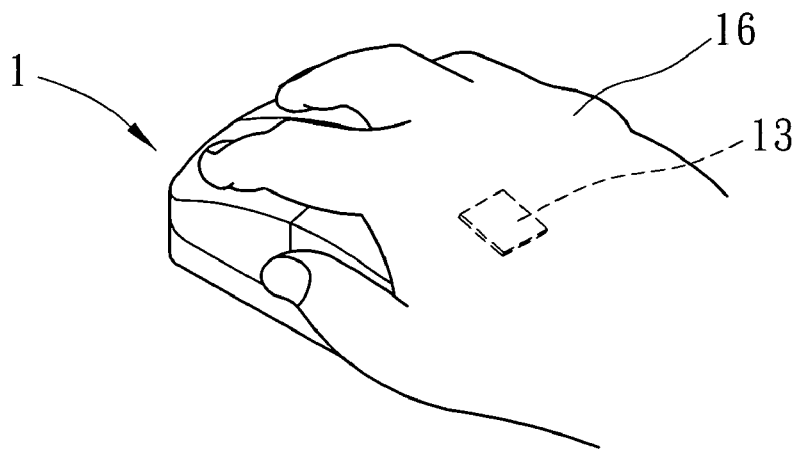
FIG. 6 is a schematic drawing of the present invention, showing a user's hand attached to the housing of the wireless power-saving computer mouse.
Figure 7:
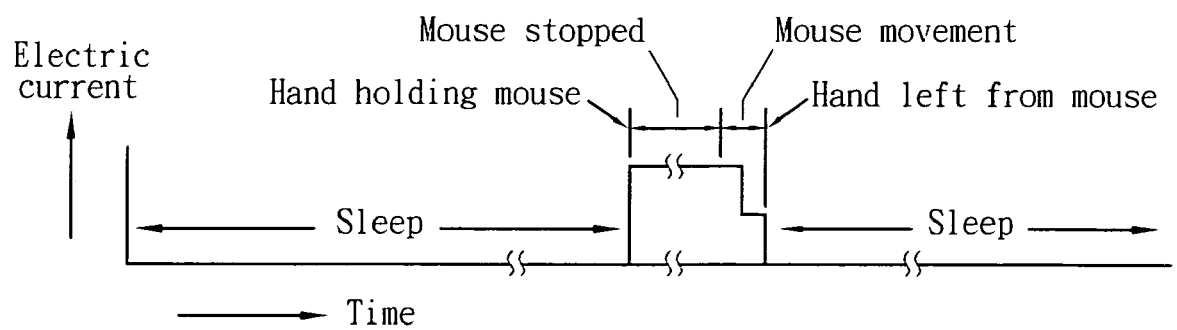
FIG. 7 explains the power consumption time during use of the power-saving computer mouse according to the present invention.

Referring to FIGS. 1~3, a wireless power-saving computer mouse 1 in accordance with the present invention comprises a housing 14, a microprocessor 11, a wireless transmitter 111, a button and roller/optical signal receiving and processing unit 112, a transmitting antenna 113, and a battery set 15 that provides the necessary working voltage. The main feature of the present invention is that the power-saving computer mouse 1 further comprises a switching transistor 121 and a proximity sensor switch that comprises a capacitive proximity sensor 12 and a charge induction plate 13. The charge induction plate 13 is mounted inside the housing 14. Further, the switching transistor 121 and the capacitive proximity sensor 12 can be installed in the microprocessor 11. When a user's hand 16 is approaching the power-saving computer mouse 1, the capacitive proximity sensor 12 is induced to change its output from low potential to high potential, thereby waking up the microprocessor 11 to trigger the switching transistor 121 and to further turn on the wireless transmitter 111 and the button and roller/optical signal receiving and processing unit 112. When the operator moves the hand 16 away from the power-saving computer mouse 1, the output of the capacitive proximity sensor 12 is changed from high potential to low potential, thereby causing the microprocessor 11 to sleep and to simultaneously cut off the switching transistor 121, and therefore the wireless transmitter 111 and the button and roller/optical signal receiving and processing unit 112 are turned off. Therefore, the power of the power-saving computer mouse 1 is turned on when the hand 16 holds the power-saving computer mouse 1, or turned off when the hand 16 is left from the power-saving computer mouse 1 (see FIGS. 4~6).

When operating a computer, the average time in which the computer mouse is operated is about 10~20% of the time in which the computer is powered on. By means of the aforesaid arrangement, the invention saves about 80% of power consumption of the computer mouse, achieving a green environment protection-oriented battery power saving effect.

Figure 8:
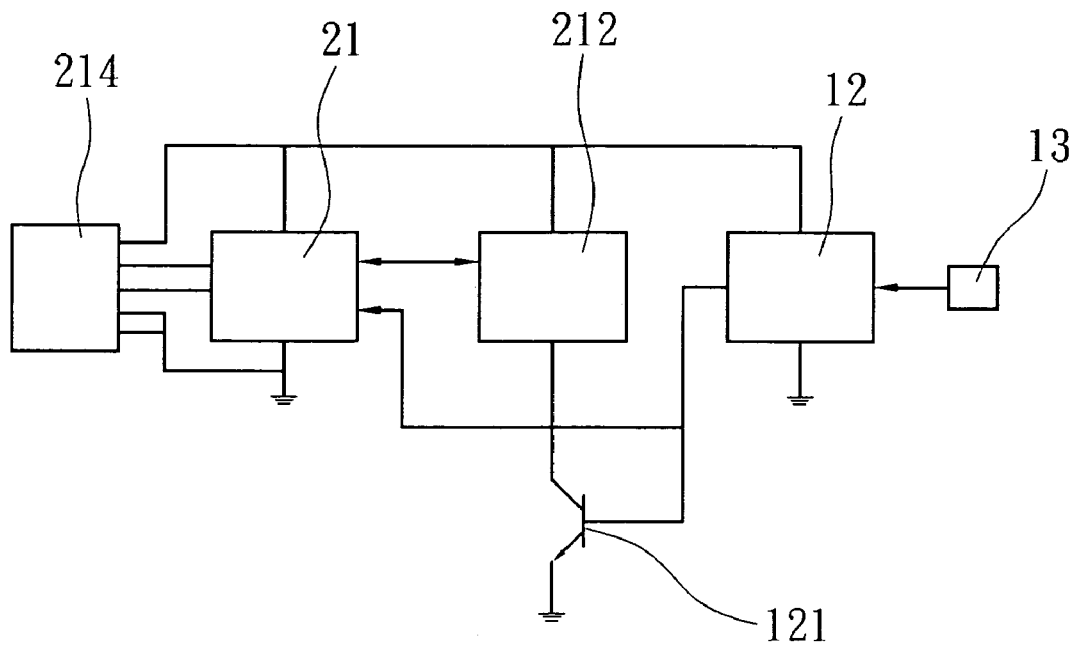
FIG. 8 is a circuit block diagram of a wired power-saving computer mouse in accordance with the present invention.
Figure 9:
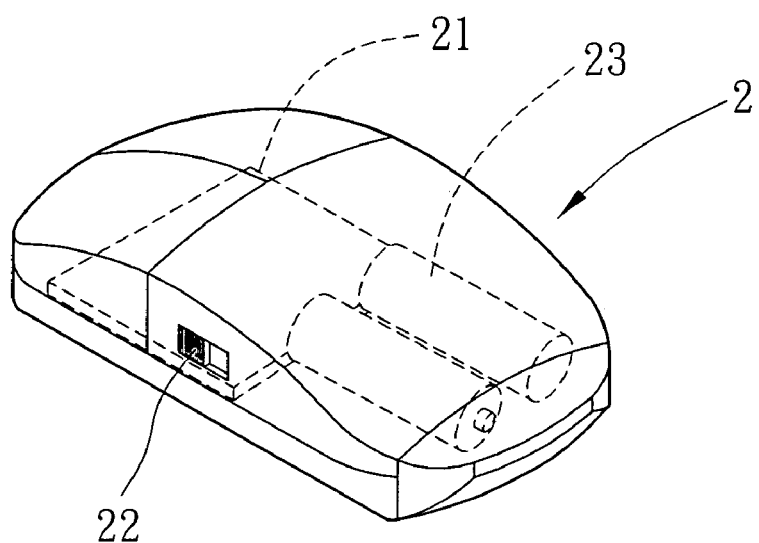
FIG. 9 is a perspective view of a wireless computer mouse according to the prior art.
Figure 10:
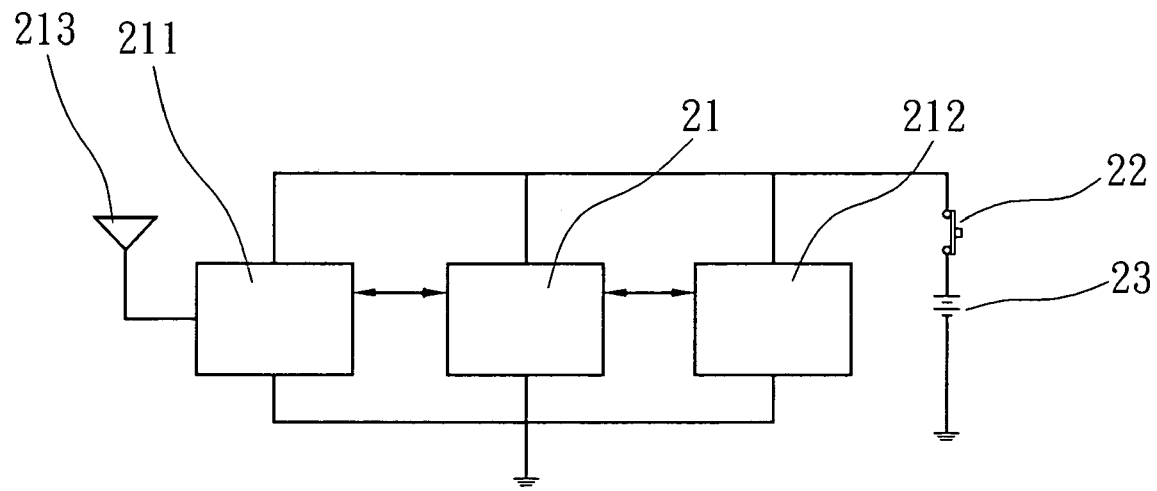
FIG. 10 is a circuit block diagram of the wireless computer mouse according to the prior art.
Figure 11:
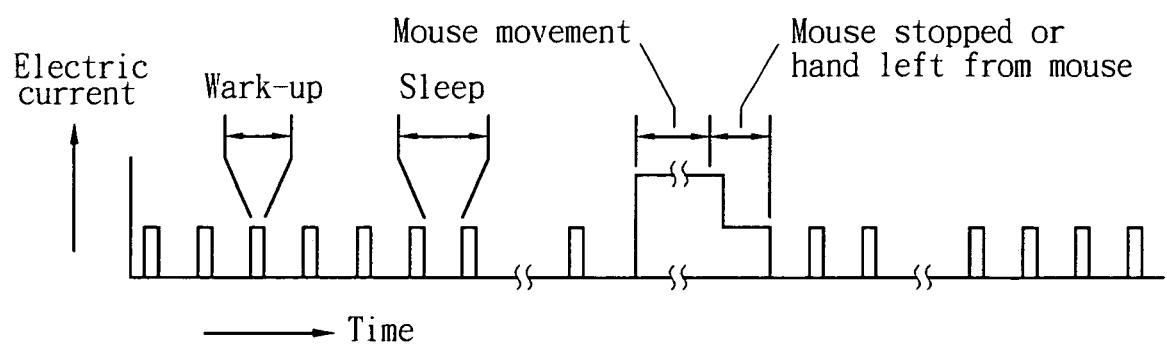
FIG. 11 explains the power consumption time during use of the wireless computer mouse according to the prior art.
Figure 12:
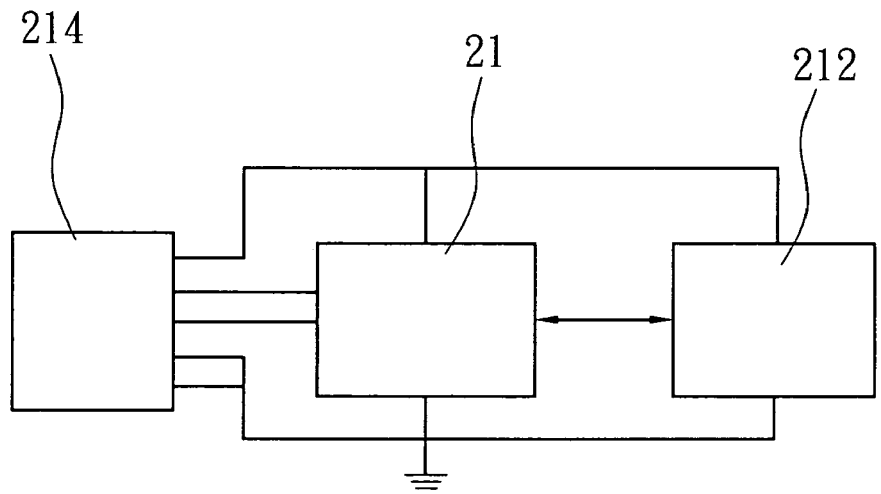
FIG. 12 is a circuit block diagram of a wired computer mouse according to the prior art.
Figure 13:
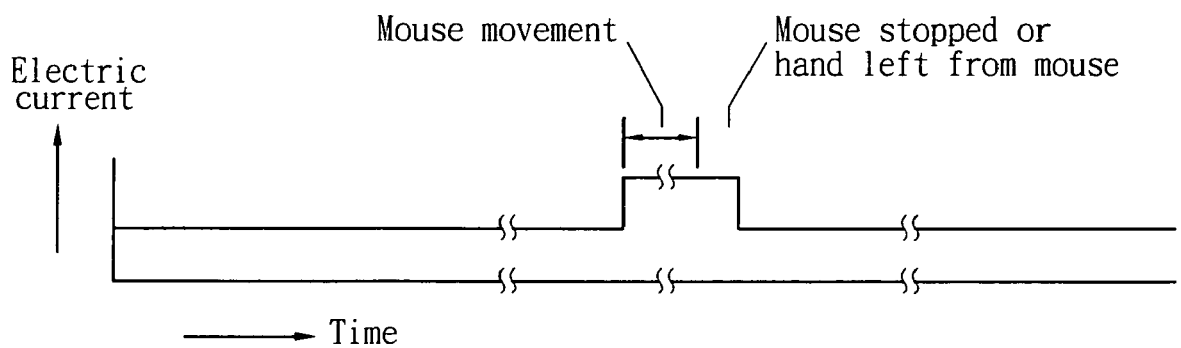
FIG. 13 explains the power consumption time during use of the wired computer mouse according to the prior art.

Further, for use in a wired computer mouse according to the present invention, as shown in FIG. 8, the control circuit of the wired computer mouse comprises a microprocessor 21, a button and roller/optical signal receiving and processing unit 212, a cable 214, a switching transistor 121, and a proximity sensor switch that comprises a capacitive proximity sensor 12 and a charge induction plate 13. The charge induction plate 13 is mounted inside the housing 14. Further, the switching transistor 121 and the capacitive proximity sensor 12 can be installed in the microprocessor 11. By means of the proximity sensor switch, the wired computer mouse achieves the same power-saving effect as the wireless power-saving computer mouse 1 shown in FIGS. 1~3.

A prototype of power-saving computer mouse has been constructed with the features of FIGS. 1~9. The power-saving computer mouse functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A power-saving computer mouse comprising:
    a housing, a microprocessor, a wireless transmitter, a button and roller/optical signal receiving and processing unit, a transmitting antenna, and a battery set,
    a switching transistor defining a conduction path switchably connecting said button and roller/optical signal receiving and processing unit to system ground, and
    a proximity sensor switch for controlling said switching transistor to switch on/off said battery set by proximity-sensing an approach of a user's hand, said proximity sensor switch comprising a capacitive proximity sensor and a charge induction plate mounted inside said housing, said capacitive proximity sensor providing a high potential output to wake up said microprocessor and to trigger said switching transistor in switching on said battery set when an operator holds said housing with a hand, said capacitive proximity sensor providing a low potential output to have said microprocessor enter sleep mode and said switching transistor switch off said battery set when the operator moves the hand away from said housing.

2. The power-saving computer mouse as claimed in claim 1, wherein said switching transistor and said capacitive proximity sensor are mounted in said microprocessor.

3. A power-saving computer mouse comprising:
    a microprocessor, a button and roller/optical signal receiving and processing unit, and a cable connectable to a computer to obtain power supply therefrom,
    a switching transistor defining a conduction path switchably connecting said button and roller/optical signal receiving and processing unit to system ground, and
    a proximity sensor switch for controlling said switching transistor to switch on/off button and roller/optical signal receiving and processing unit by means of proximity-sensing an approaching of a user's hand, said proximity sensor switch comprising a capacitive proximity sensor and a charge induction plate mounted inside said housing, said capacitive proximity sensor providing a high potential output to wake up said microprocessor and to trigger said switching transistor in switching on said button and roller/optical signal receiving and processing unit when an operator holds said housing with a hand, said capacitive proximity sensor providing a low potential output to have said microprocessor enter sleep mode and said switching transistor switch off said button and roller/optical signal receiving and processing unit when the operator moves the hand away from said housing.

4. The power-saving computer mouse as claimed in claim 3, wherein said switching transistor and said capacitive proximity sensor are mounted in said microprocessor.

\* \* \* \* \*